(No Model.) 2 Sheets—Sheet 1.
I. H. SMALL.
Elevator-Governor.
No. 228,284. Patented June 1, 1880.
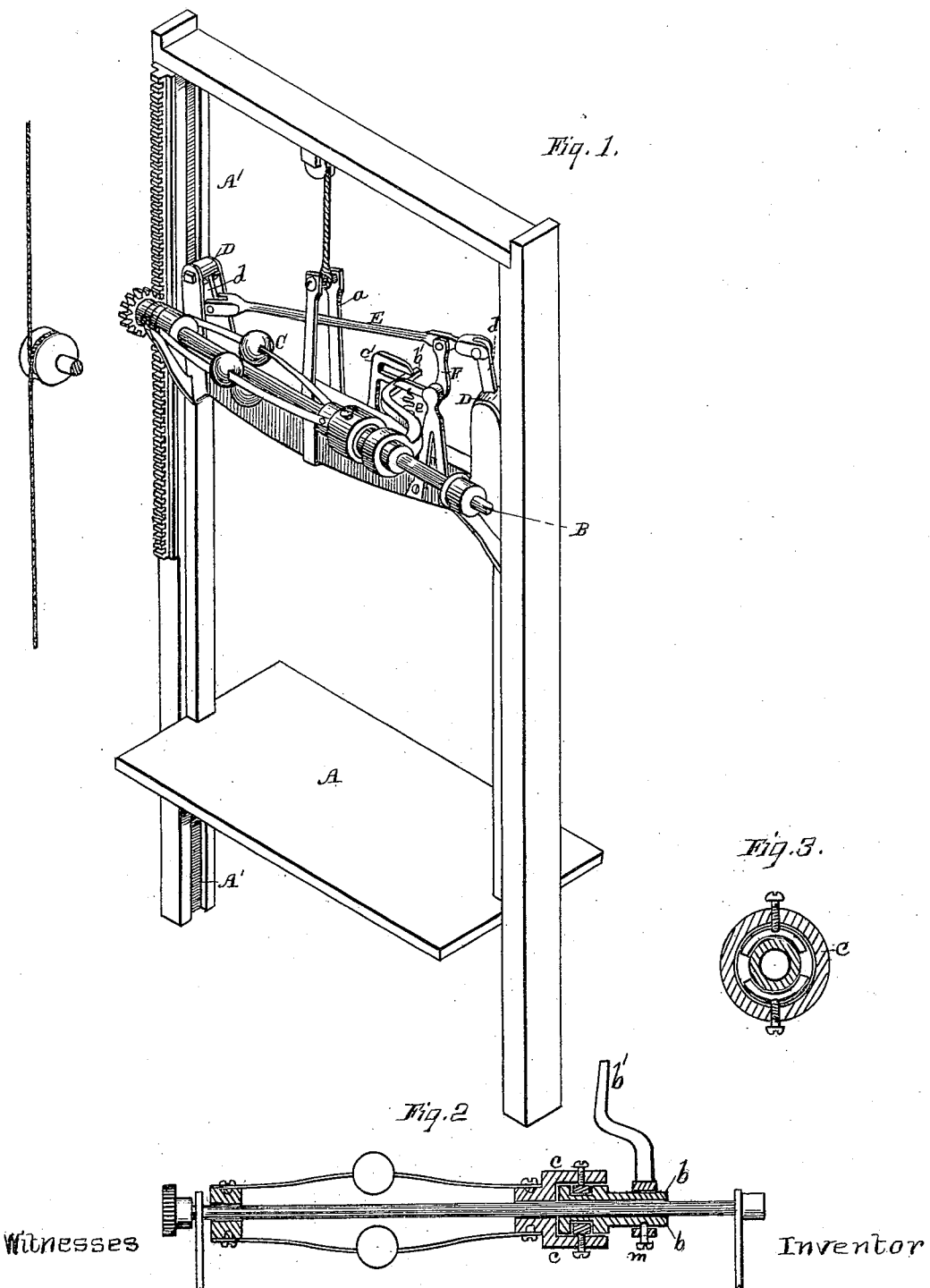
Witnesses
Frank A. Brooks
Geo. H. Strong
Inventor
Isaac H. Small
By Dewey & Co.
Attys (No Model.) 2 Sheets—Sheet 2.

I. H. SMALL.
Elevator-Governor.

No. 228,284. Patented June 1, 1880.

Witnesses
Frank A. Brooks
Geo. H. Strong

Inventor
Isaac H. Small
By
Dewey & Co.
Attys

UNITED STATES PATENT OFFICE.

ISAAC H. SMALL, OF SAN FRANCISCO, CALIFORNIA.

ELEVATOR-GOVERNOR.

SPECIFICATION forming part of Letters Patent No. 228,284, dated June 1, 1880.

Application filed March 23, 1880. (No model.)

*To all whom it may concern:*

Be it known that I, ISAAC H. SMALL, of the city and county of San Francisco, and State of California, have invented an Improved Elevator-Governor; and I hereby declare the following to be a full, clear, and exact description thereof.

My invention relates to that class of elevators wherein the safety-clutches are operated by rotating governors independent of the hoisting-rope; and it consists of certain details of construction, as hereinafter described and specifically claimed.

Figure 4:
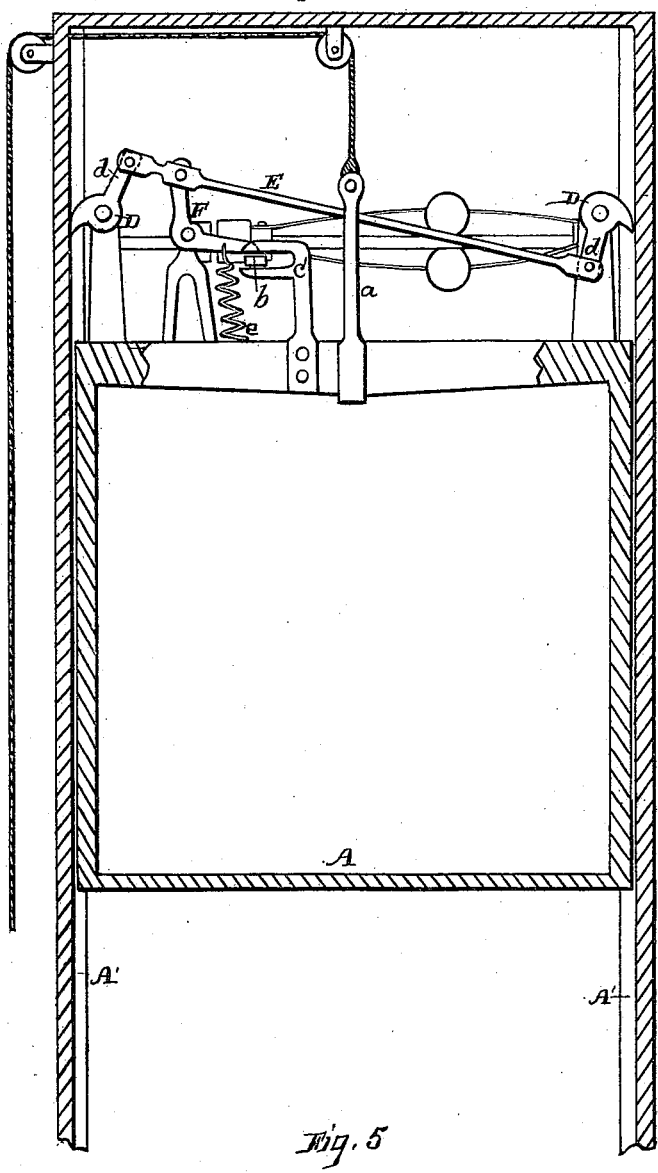
Figure 5:
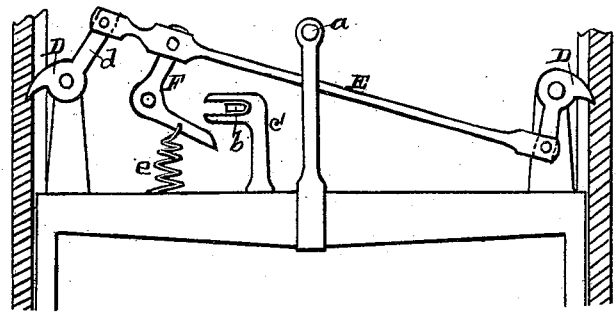

Figure 1 is a perspective view of my device. Fig. 2 shows the governor with sections of the sleeve and collar. Fig. 3 is a transverse section. Fig. 4 is a vertical section of the guides and elevator. Fig. 5 is a view showing the lever F released and the dogs engaged with the guides.

Let A represent an ordinary elevator moving in the guides A', the top bar of said elevator or cage having a shackle or link, $a$, with which the cable or hoisting-rope is connected.
On suitable brackets projecting from the sides of the upper end of the cage or elevator is journaled a governor-shaft, B, on which is a governor, C, of any suitable form, preferably of that class known as "ball-governors." On the end of the governor-shaft is a pinion engaging with a rack-bar on the sides of the guides to give the shaft a rotary motion. The same object will be accomplished by a friction-roller, or by putting a grooved pulley on the end of the shaft and taking a turn around it of a rope or cable which has its ends secured at top and bottom of the elevator-well.

On one end of the governor is a collar, $c$, fitting over a sliding sleeve, $b$, on the shaft. This collar may revolve around said sleeve; but when moved horizontally on the shaft by the action of the governor the collar draws the sleeve with it. Secured to this sleeve by means of a set-screw, $m$, is a dog, $b'$, the outer end of which rests in a guide, $c'$, in the upper brace of the cage or elevator, and thus prevents the sleeve from rotating with the governor and spindle.

That portion of the sleeve within the collar is grooved, and has two metallic semicircular shoes fitted loosely into the groove. Screws pass through the collar into these semicircles, which are thus rigidly connected with the collar, but are allowed to move in the groove of the sleeve. This gives a broad bearing-surface and prevents wear at this point.

The dogs or catches D are swiveled on standards on the ends of the upper bar of the elevator. An arm, $d$, extends from each of these swiveled dogs or catches, the arm of one extending upward and the other downward, as shown. A single rod, E, connects these two arms, and is provided with a bell-crank lever, F, which rests on the dog $b'$. A spring, $e$, is arranged to draw this lever down when it is released from the dog.

The operation of my device is as follows: As the elevator is raised and lowered by the cable in the usual way, the friction, ratchet, or rope connected with the end of the governor-shaft causes the governor to revolve whenever the cage is in motion. If at any time the rope should break or any accident occur which would cause the speed of the elevator to be accelerated to a higher degree than safety warrants, then the governor revolves with proportionate speed. At a certain point the collar of the governor will have moved the sleeve with its dog far enough forward to release the end of the bell-crank lever F from said dog. The spring $e$ then draws the bell-crank lever down and moves the bar or rod E over, and this, in its turn, by being connected with the arms of the dogs or catches, throws said dogs into the sides of the guides, and they hold the elevator.

It will be seen that the instant the speed becomes greater than is proper for safety the dogs or catches stop and hold the cage, whether the rope breaks or not. By regulating the position of the lever-tripping dog $b'$ with relation to the sleeve on the governor-shaft this trigger or dog may be set so as to stop the elevator at any specified rate of speed which would be slightly above that at which the elevator is ordinarily run.

This device is entirely independent of any action of the cable. No matter whether the cable, when it breaks, slacks or not, the governor will operate the catches the instant the speed becomes too great for safety. The cage can therefore never acquire a momentum which will endanger the breakage of the dogs or catches when they engage with the wood-work of the guides in stopping the cage.

Having thus described my invention, what I claim as new, and desire to secure by Letters Patent, is—

The elevator-cage A, rotating bar B, carrying the governor C, in combination with the sliding sleeve $c\ b$, carrying an adjustable dog, $b'$, guide $c'$, bell-crank lever F, rod E, connecting the safety-clutches, and spring $e$, all constructed, arranged, and operated as set forth.

In witness whereof I have hereunto set my hand.

ISAAC HENRY SMALL.

Witnesses:
S. H. NOURSE,
FRANK A. BROOKS.